3,391,681
PREPARATION OF ALUMINUM AND CHROMIUM
SESQUIOXIDE FIBERS
Wolfgang A. Westdorp, Wilmington, Del., assignor to
E. I. du Pont de Nemours and Company, Wilmington,
Del., a corporation of Delaware
No Drawing. Continuation-in-part of application Ser. No. 420,161, Dec. 21, 1964. This application Dec. 29, 1965, Ser. No. 517,467
7 Claims. (Cl. 23—142)

ABSTRACT OF THE DISCLOSURE

Single crystal aluminum and chromium sesquioxide fibers having the corundum crystal structure formed by bringing water and aluminum or chromium suboxide vapor into contact with a substrate composed of a polycrystalline metal oxide in the presence of molten particles of Co or Ni, with an inorganic material having Si-O bonds present when the suboxide is aluminum suboxide are claimed. These fibers are useful in the form of thermal insulating sheets or mats, as filtering media for molten metals and as fillers or reinforcing agents in plastics, ceramics or metals.

DESCRIPTION OF THE INVENTION

This application is a continuation-in-part of U.S. Ser. No. 420,161, filed Dec. 21, 1964, and now abandoned.

This invention relates to single crystals of aluminum and chromium sesquioxides. More particularly, it relates to a new process for making single crystal fibers of aluminum and chromium sesquioxides having the corundum crystal structure.

Recently there have been described methods for preparing fibrous corundum, or $\alpha$-aluminum oxide ($\alpha$-Al$_2$O$_3$) as it is also named, which have produced virtually perfect single crystals of corundum that have extremely high tensile strengths, hexagonal cross-sections and diameters, or widths, of 0.5–5–50 microns and lengths of 0.5–50 mm. Such corundum fibers, or whiskers as they are sometimes called, are especially well suited for use in certain applications. For example, they are useful in forming sheets or mats that can be used as thermal insulation or as filtering media for molten metals, and the loose fibers are also useful as fillers or reinforcing agents in plastics, ceramics, or metals.

While the hitherto known methods of producing fibrous corundum can be operated with some success, they are not entirely satisfactory in some respects. It is therefore desirable to provide an improved method for making fibrous corundum. It is also desirable to provide novel fibers of chromium sesquioxide having the corundum crystal structure and a process for their preparation.

A novel process for preparing fibrous crystals of aluminum and chromium sesquioxides having the corundum crystal structure is provided by this invention. This process comprises bringing water and the vapor of a suboxide of aluminum or chromium into contact with a substrate composed of a polycrystalline metal oxide having close atomic registry to the crystal structure of the metal oxide fibers being formed, in the presence of a coactivator consisting of molten particles of cobalt or nickel, at least a portion of the polycrystalline substrate and the coactivator being maintained at a temperature below the melting point of the metal oxide fibers being formed, but above the melting point of the metal coactivator. When the suboxide reactant is an aluminum suboxide it is also necessary that an inorganic material having Si-O bonds be present in the reaction zone. This Si-O material can be a separate compound, such as silica or a silicate, placed in the reaction zone, or it can be an impurity in the polycrystalline substrate in the reaction zone. While the presence of such Si-O linkage in the reaction zone is essential in the process, the actual amount of it needed is not large. For example, a polycrystalline alumina substrate containing less than 500 p.p.m. of silicon impurity is effective in the process of this invention. Cobalt- or nickel-tipped single crystal fibers of the sesquioxide of corundum structure corresponding to the particular metal suboxide employed as reactant are isolated from the polycrystalline metal oxide substrate.

The single crystal fibers of chromium sesquioxide having the corundum crystal structure are novel and they are an embodiment of this invention.

Any known sources of the chromium or aluminum suboxide reactants can be employed in the process of this invention. A convenient source of these suboxides comprises generating them in situ by passing hydrogen over the polycrystalline aluminum or chromium sesquioxide substrate heated to a temperature near or above its melting point; e.g., for an aluminum sesquioxide substrate a temperature of 1700–2300° C. is suitable and for chromium sesquioxide a temperature of 1800–2200° C. is suitable. Temperatures above 2300° C. can also be used, if desired, to generate the metal suboxide. Under these conditions the suboxides of aluminum and chromium are probably produced in accordance with the following reversible reaction showing formation of a particular aluminum suboxide and water from aluminum sesquioxide.

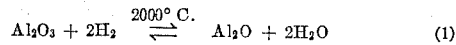

$$Al_2O_3 + 2H_2 \underset{}{\overset{2000° C.}{\rightleftharpoons}} Al_2O + 2H_2O \qquad (1)$$

In another embodiment of the process of this invention, aluminum or chromium suboxide vapor can be generated independently; e.g., by the reaction of the element and oxygen, and brought into contact with water vapor, the polycrystalline metal oxide substrate and metal coactivator as described above.

As the aluminum suboxide or chromium suboxide vapor molecules and water vapor react in the presence of the nickel or cobalt particles, or droplets, at an operating temperature between the melting points of cobalt or nickel, 1495° and 1455° C., respectively, and the melting points of the aluminum or chromium sesquioxide substrates, 2050° and 1990° C., respectively, it is believed that the metal particles promote the growth of single crystals of corundum or chromium sesquioxide at the liquid-solid interface between the liquid metal droplets and the solid polycrystalline substrate. These single crystals grow in the [0001] crystal direction. Each single crystal fiber is tipped with a particle of nickel or cobalt having a diameter larger than the diameter of the corundum or chromium sesquioxide fibers. In some cases the fibers grown by this method have hollow centers; however, the finest and longest fibers do not. In addition to the corundum fibers that are formed there are also a few corundum crystals in the form of blades. These are also single crystals of α-aluminum oxide which have grown in the <1100> or <1210> direction.

The dimensions of the single crystal fibers obtained in this process can vary widely. In general, the length and width, or diameter, of the fibers depend on the number and size of the nickel or cobalt nucleation sites on the polycrystalline substrate and on the duration of the reaction time. The smaller the size of the metal particles on the aluminum or chromium sesquioxide substrates the smaller is the diameter of the fibers produced. The fibers continue growing as long as the aluminum or chromium suboxide in vapor form is brought into contact with the growth sites. Consequently, the longer fibers are obtained with the longer reaction times. Thus, using a reaction temperature of 1700–2050° C. for formation of aluminum suboxide from hydrogen and alumina, and a fiber growing zone of 1550–1800° C., corundum fibers having diameters of 0.4–5 microns and lengths of 10 to 500 microns are obtained in reaction periods of 10 to 90 minutes. Longer fibers are obtained by extending the reaction period to several hours; e.g., 3 hours. Similarly, using a reaction temperature of 1800–1950° C. for formation of chromium suboxide from hydrogen and chromium sesquioxide and a fiber growing zone of 1500–1850° C., chromium sesquioxide fibers having diameters of 1–6 microns and lengths of 10–400 microns, are obtained in reaction periods of 3–15 minutes. Longer fibers are obtained by extending the reaction period to several hours; e.g., 3 hours.

Under the above-described operating conditions, the cobalt or nickel particles are subjected to temperatures appreciably higher than their melting points. This allows vaporization of the metals followed by deposition of very small metal droplets on the aluminum or chromium sesquioxide substrate in the cooler part of the reaction zone. The fibers grown on such small nucleation sites are therefore very small in diameter. When fibers of larger diameters are desired, the process can be operated with the reaction zone in which fibers are formed maintained at temperatures at or only slightly above the melting points of the metal coactivators of desired particle size deposited on the polycrystalline metal oxide substrate.

In another embodiment of the process, nickel or cobalt in the form of wires or blocks can be placed on the portion of the metal oxide substrate heated to 1900–2300° C. or higher. Under these conditions the nickel and cobalt vapor that is generated deposits on the cooler portion of the metal oxide substrate to form nucleation sites of very small diameter.

In still another embodiment the substrate can be physically separate and chemically different from the metal oxide vapor species source. More particularly, the substrate may be chemically different from the oxide vapor source but have close atomic registry with respect to the metal oxide fibers being formed. For example, fibers of corundum can be grown on a chromium sesquioxide substrate using aluminum suboxide vapor produced by heating aluminum sesquioxide to about 2000° C.

The inorganic silicon materials having Si-O bonds that are essential to the growth of corundum fibers in this process can be present as any of a wide variety of materials. Those that are especially suitable include silica gel, various types of silica, and inorganic silicates. Other specific materials that can be used include salts of silicic acid, e.g., calcium metasilicate and calcium orthosilicate, quartz, crushed vitreous silica and silicate minerals such as the feldspars, micas, zeolites, and mullite. In some cases the silicon material can be provided by use of polycrystalline alumina substrates that contain silica impurities, e.g., the alumina known commercially as "Alundum" or by use of an aluminum silicate substrate, e.g., mullite ($3Al_2O_3 \cdot 2SiO_2$).

The hydrogen used in the process can be of the grade commercially available. It need not be subjected to any special drying or purification steps. It may contain added water vapor. However, moist hydrogen is less effective in some cases, so it is less preferred.

The nickel and cobalt used in the process can also be of the grades commercially available. The oxides of these metals can also be used if a reducing atmosphere is employed in the reaction zone so that the oxides are reduced to the free metals.

The particular type of reaction vessel in which the process is carried out is not critical. Any reaction vessel which will provide a reaction zone of 1700–2300° C., or more, around the polycrystalline metal oxide substrate in contact with cobalt or nickel and another zone maintained at a temperature below the melting point of α-$Al_2O_3$ or $Cr_2O_3$ and above the melting point of the metal coactivator employed can be used. It is convenient to employ a water-cooled, cylindrical, brass furnace in which an electrical resistance unit, e.g., a ribbon of tungsten, can be suspended to provide the necessary heat and to serve as a support for the polycrystalline metal oxide substrate and cobalt or nickel particles. The furnace also contains entrance and exit tubes for passing a stream of hydrogen through the reaction zone. The resistance unit in the furnace is connected to a source of electric current that can be controlled to provide the amount of current required to produce a temperature of 1700–2300° C., or more, in one part of the reaction zone. The geometry of the furnace and heating strip is such that a part of the metal oxide substrate is maintained below its melting point. The reaction vessel can be constructed of any material that is inert to the reactants under conditions of operation. Examples of suitable materials of construction include brass, steel and the like.

The metal oxide fibers produced in this process are tipped with small globules of nickel or cobalt having a diameter larger than that of the fibers. When the metal tips do not interfere in the particular use for which the fibers are intended, they can be used directly after the fibers are removed from the substrate. However, when fibers having no metal tips are desired, the cobalt or nickel globules can be removed mechanically. The metal oxide fibers can be separated from the cobalt or nickel globules by conventional means involving differences in the specific gravity of the fibers and metals. The nickel or cobalt globules can also be removed from the metal oxide fibers by chemical means, e.g., by means of selective solvents, e.g., nitric acid, sulfuric acid, etc.

The process of this invention is illustrated in further detail by the following Examples 1–16. These examples are carried out by the following general procedure:

Finely divided nickel or cobalt powder (99.98% pure) having a maximum particle size of 177 microns is spread uniformly on the surface of the polycrystalline alumina substrate having dimensions of 1 x 5 x 20 mm. or on polycrystalline $Cr_2O_3$ pellets (compacted from $Cr_2O_2$ powder) having dimensions of 3 x 4 x 5 mm. This coated substrate is then placed on a tungsten heating strip, 5 mm. wide, 0.127 mm. thick, and 4 cm. between electric current leads, which is situated in the center of a cylindrical, water-cooled, brass furnace chamber 9 cm. in diameter and 8 cm. deep. The furnace is fitted with a gas inlet and the cover of the furnace is fitted with a gas outlet and a silica window for observation of the tungsten filament. The furnace is closed and subjected to evacuation after which it is filled with hydrogen and the flow rate through the chamber adjusted to approximately one liter per minute. (In some cases a rate of 500 cc. per minute is used.) In some examples, commercially available hydrogen is employed and in others the hydrogen is first passed through a wash-bottle filled with water to provide added water vapor. The commercially available hydrogen has a dew point of −62° C. (which indicates a water vapor content of 7.8 ppm), and this is referred to in the following table as dry hydrogen. The hydrogen passed through the wash-bottle has a dew point of 17° C., and this is referred to in the table as wet hydrogen. Electric current is passed through the tungsten strip so that the temperature of a portion of the polycrystalline metal oxide substrate is maintained at the values listed in Table I, below, and other portions of the substrate are at a temperature below the melting point of the metal oxide fibers formed, but above the melting point of the metal coactivator (the temperatures being determined by means of an optical pyrometer). In most of Examples 1–12, small portions of the polycrystalline alumina substrate in direct contact with the tungsten heating strip are molten; consequently, these portions of the substrate are at temperatures above 2050° C., the melting point of corundum. After reaction periods ranging from a few minutes, e.g., 3–10 minutes, to an hour or more, e.g., 1–3 hours, the electric current to the furnace is turned off and the cobalt or nickel globule-tipped fibers are removed from the edges of the polycrystalline metal oxide substrate. The fibers obtained have diameters ranging from 0.4–5 microns and lengths ranging from 1 to 500 microns. The cobalt or nickel globules on the end of each fiber have a diameter larger than that of the fiber. The following Table I lists the specific polycrystalline metal oxide substrates, metal coactivator or nucleation particles, reaction temperatures and times, types of hydrogen, and weights of metal oxide fibers of corundum structure obtained in Examples 1–16.

The importance of the cobalt and nickel particles as nucleation sites on the polycrystalline substrate in the process of this invention is shown by the fact that the amount of fibers grown in the presence of cobalt or nickel particles is at least an order of magnitude greater than that obtained by procedures which differ only by the omission of the metal coactivator. For example, the yield of corundum fibers in Example 5 is 0.012 g. while the yield of corundum fibers in an experiment carried out under exactly the same conditions except that no metal coactivator particles were used gave only 0.0008 g. of corundum fibers. Likewise, the yield of $Cr_2O_3$ fibers in Example 15 is about 0.0004 g. while the yield of $Cr_2O_3$ fibers in an experiment carried out under exactly the same conditions except that no metal coactivator was used gave less than 0.00004 g. of $Cr_2O_3$ fibers.

The foregoing detailed description has been given for clearness of understanding only and no unnecessary limitations are to be understood therefrom. The invention is not limited to the exact details shown and desecribed, for obvious modifications will occur to those skilled in the art.

The embodiments of the invention in which an exclusive property or privilege is claimed are defined as follows:

1. Process for preparing single crystal, metal oxide fibers having the corundum crystal structure, said metal

TABLE I.—PREPARATION OF METAL OXIDE FIBERS OF CORUNDUM STRUCTURE

| Example No. | Polycrystalline Metal Oxide Substrate | Nucleation Particles | Temperature of suboxide vapor generation zone, °C. | Time, min. | Hydrogen (at 1 l./min.) | Fibers Kind | Weight/g. |
|---|---|---|---|---|---|---|---|
| 1 | Alundum | Ni | 2,000 | 90 | Wet | Corundum | 0.005 |
| 2 | do | Ni | 2,000 | 10 | Wet | do | 0.0004 |
| 3 | do | Co | 2,000 | 90 | Wet | do | 0.006 |
| 4 | do | Co | 2,000 | 10 | Wet | do | 0.0005 |
| 5 | do | Ni | 2,000 | 30 | Dry | do | 0.012 |
| 6 | do | Ni | 2,000 | 10 | Dry | do | 0.005 |
| 7 | do | Co | 2,000 | 90 | Dry | do | 0.01 |
| 8 | do | Co | 2,000 | 10 | Dry | do | 0.004 |
| 9 | Mullite | Ni | 2,000 | 60 | Wet | do | 0.0004 |
| 10 | do | Ni | 2,000 | 30 | Dry | do | 0.008 |
| 11 | Alundum | NiO | 2,000 | 90 | Wet | do | <0.0003 |
| 12 | do | CoO | 2,000 | 90 | Wet | do | <0.0003 |
| 13 | Morganite [1] | Ni | 2,300 | 5 | [2] Dry | do | <0.005 |
| 14 | $Cr_2O_3$ pellets on alundum support | Ni | 2,000 | 35 | Wet | do Also $Cr_2O_3$ | <0.001 <0.001 |
| 15 | $Cr_2O_3$ pellets | Ni | 1,890 | 15 | Wet | $Cr_2O_3$ | ca. 0.0004 |
| 16 | do | Co | 1,920 | 3 | Wet | $Cr_2O_3$ | ca. 0.0005 |

[1] Morganite is an $\alpha$-$Al_2O_3$ containing less than 500 p.p.m. of Si impurity.
[2] Hydrogen flow at 500 cc./minute.

The fibers obtained in the above Examples 1–13 are shown by electron microprobe analysis to have metallic tips primarily of either cobalt or nickel, and with the only metallic element in the stems being aluminum. The observation of red cathode luminescence in combination with these electron microprobe analyses shows that the aluminum in the fibers is in the form of corundum ($\alpha$-$Al_2O_3$). Examination of individual fibers under the microscope at magnifications up to 2000× show the known features of $\alpha$-$Al_2O_3$ fibers, e.g., hexagonal cross-section for fibers growing in the c- or [0001] crystal direction.

Both corundum fibers and $Cr_2O_3$ fibers are formed on the $Cr_2O_3$ substrate employed in Example 14. This illustrates the growth of fibers of one particular metal oxide ($\alpha$-$Al_2O_3$) on a polycrystalline substrate of different chemical composition ($Cr_2O_3$) but of close atomic registry. In this experiment chromium suboxide vapor was also formed along with aluminum suboxide vapor and this produced $Cr_2O_3$ fibers at some of the nucleation sites on the $Cr_2O_3$ polycrystalline substrate.

The globule-tipped $Cr_2O_3$ fibers obtained in Examples 15–16 are shown by electron microprobe analysis to have metallic tips of nickel or cobalt with the only metallic element in the stems being chromium. The X-ray diffraction pattern obtained on these chromium stems was a clear $Cr_2O_3$ pattern. The cross-sections of most of the $Cr_2O_3$ fibers are also hexagonal.

oxide fibers being aluminum sesquioxide or chromium sesquioxide, which comprises bringing water and the vapor of a suboxide of aluminum or chromium into contact with a substrate composed of alumina, alumina containing silica, aluminum silicate, chromium sesquioxide or mixtures thereof, in the presence of a coactivator consisting of molten particles of cobalt or nickel, at least a portion of the polycrystalline substrate and coactivator being maintained at a temperature in the range 1455 to 2300° C. with the proviso that when the suboxide reactant is aluminum suboxide it is necessary that an inorganic material having Si-O bonds be present in the reaction zone.

2. Process of claim 1 wherein the suboxide reactant is generated in situ by passing hydrogen over polycrystalline aluminum sesquioxide or chromium sesquioxide substrate.

3. Process of claim 1 wherein the aluminum suboxide vapor is generated by reaction of oxygen and aluminum.

4. Process of claim 1 wherein the nickel or cobalt coactivator is in the form of a wire or block placed on a portion of the metal oxide substrate heated to 1900–2300° C.

5. Process of claim 1 wherein the metal of the substrate and the metal of the oxide vapor species are identical.

6. Process of claim 1 wherein the substrate and the metal oxide fibers being formed are physically distinct and chemically different.

7. Process of claim 1 wherein the suboxide is aluminum suboxide and the inorganic silicon material having the Si-O bonds is silica.

References Cited

UNITED STATES PATENTS

| | | | |
|---|---|---|---|
| 3,011,870 | 12/1961 | Webb et al. | 23—142 |
| 3,023,115 | 2/1962 | Wainer et al. | 23—142 X |
| 3,077,380 | 2/1963 | Wainer et al. | 23—142 |

FOREIGN PATENTS 608,032  11/1960  Canada.

OTHER REFERENCES

Dorsmus et al.: "Growth and Perfection of Crystals," John Wiley & Sons, Inc., New York, 1958, p. 78. QD921 I5.

Materials in Design Engineering, January 1958, p. 150. TA401 M5.

OSCAR R. VERTIZ, *Primary Examiner.*

MILTON WEISSMAN, *Examiner.*

G. T. OZAKI, *Assistant Examiner.*